US009622170B2

(12) United States Patent
Zhu et al.

(10) Patent No.: US 9,622,170 B2
(45) Date of Patent: Apr. 11, 2017

(54) WIRELESS COMMUNICATION IN HETEROGENEOUS NETWORKS

(71) Applicant: BlackBerry Limited, Waterloo (CA)

(72) Inventors: Yajun Zhu, Beijing (CN); Zhijun Cai, Euless, TX (US); David Nigel Freeman, Basingstoke (GB); Rene Waraputra Purnadi, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 133 days.

(21) Appl. No.: 13/667,937

(22) Filed: Nov. 2, 2012

(65) Prior Publication Data

US 2014/0128078 A1 May 8, 2014

(51) Int. Cl.
*H04W 52/02* (2009.01)
*H04W 84/04* (2009.01)
*H04W 36/04* (2009.01)
*H04W 36/00* (2009.01)

(52) U.S. Cl.
CPC .... *H04W 52/0206* (2013.01); *H04W 36/0055* (2013.01); *H04W 36/04* (2013.01); *H04W 84/045* (2013.01); *Y02B 60/50* (2013.01)

(58) Field of Classification Search
CPC ......... H04W 52/0206; H04W 36/0055; H04W 36/04; H04W 84/045; Y02B 60/50
USPC ....... 455/436–442, 448, 434, 435.2; 370/331
See application file for complete search history.

(56) References Cited

U.S. PATENT DOCUMENTS

| 8,320,965 | B2* | 11/2012 | Kwun | H04W 52/0229 455/561 |
| 8,548,479 | B2* | 10/2013 | Kim | H04W 36/0055 370/331 |
| 8,797,935 | B2* | 8/2014 | Lee et al. | 370/312 |
| 8,903,405 | B2* | 12/2014 | Noh | H04W 36/30 455/422.1 |
| 2009/0286496 | A1* | 11/2009 | Yavuz | H04W 52/241 455/127.1 |
| 2010/0173630 | A1* | 7/2010 | Han | H04W 36/0072 455/433 |

(Continued)

FOREIGN PATENT DOCUMENTS

EP 2400805 12/2011
WO 2011145886 11/2011

OTHER PUBLICATIONS

Zhisheng Niu, Yiqun Wu, Jie Gong, Zexi Yang, "Cell Zooming for Cost-Efficient Green Cellular Networks"; IEEE Communications Magazine, vol. 48, Issue 11, pp. 74-79, 2010.

(Continued)

*Primary Examiner* — Brandon Miller
(74) *Attorney, Agent, or Firm* — Fish & Richardson P.C.

(57) ABSTRACT

Systems, methods, and apparatuses for energy saving in heterogeneous wireless communication networks are provided. The small cell (e.g., pico cell, relay cell, femto cell) may adjust its transmit power based on the requirement of user equipments (UEs) in the cell's coverage. The small cell may detect a UE entering its coverage with or without assistance from the macro cell. An appropriate small cell may be selected to serve the UE based on its traffic load when the UE is located in the coverage of multiple small cells. The small cell may also transmit auxiliary synchronization signals to reduce the association time for the UE.

6 Claims, 11 Drawing Sheets

(56) References Cited

U.S. PATENT DOCUMENTS

| | | | |
|---|---|---|---|
| 2010/0179630 A1* | 7/2010 | Williams | 607/127 |
| 2011/0194513 A1* | 8/2011 | Kim | H04W 52/244 |
| | | | 370/329 |
| 2011/0243075 A1* | 10/2011 | Luo et al. | 370/329 |
| 2012/0040642 A1* | 2/2012 | Zhu | 455/411 |
| 2012/0100851 A1* | 4/2012 | Zheng | H04W 36/0094 |
| | | | 455/436 |
| 2012/0149363 A1* | 6/2012 | Faerber | H04W 52/04 |
| | | | 455/423 |
| 2012/0179363 A1* | 7/2012 | Pierfelice | 701/423 |
| 2012/0201318 A1* | 8/2012 | Seo | H04L 27/2607 |
| | | | 375/260 |
| 2012/0202554 A1 | 8/2012 | Seo et al. | |
| 2012/0213171 A1 | 8/2012 | Jeong et al. | |
| 2012/0276895 A1* | 11/2012 | Choi et al. | 455/422.1 |
| 2012/0289178 A1* | 11/2012 | Matsumura | H04W 52/0206 |
| | | | 455/403 |
| 2013/0040675 A1 | 2/2013 | Ant et al. | |
| 2013/0051240 A1 | 2/2013 | Bhattad et al. | |
| 2013/0121186 A1 | 5/2013 | Vajapeyam et al. | |
| 2013/0188500 A1* | 7/2013 | He | H04W 28/16 |
| | | | 370/252 |
| 2013/0195025 A1* | 8/2013 | Chatterjee | H04W 72/085 |
| | | | 370/329 |
| 2013/0225188 A1 | 8/2013 | Seo et al. | |
| 2014/0086166 A1 | 3/2014 | Lindbom et al. | |
| 2014/0087735 A1* | 3/2014 | Vikberg | H04W 36/0055 |
| | | | 455/436 |
| 2014/0112177 A1 | 4/2014 | Park et al. | |
| 2014/0120928 A1* | 5/2014 | Dimou | H04W 16/08 |
| | | | 455/452.1 |
| 2014/0120967 A1* | 5/2014 | Purnadi et al. | 455/501 |
| 2014/0126438 A1 | 5/2014 | Zhu et al. | |
| 2014/0177467 A1 | 6/2014 | Kim et al. | |
| 2014/0177532 A1 | 6/2014 | Kim et al. | |
| 2015/0043406 A1 | 2/2015 | Ko et al. | |
| 2015/0208425 A1* | 7/2015 | Caretti | H04W 72/082 |
| | | | 370/336 |

OTHER PUBLICATIONS

Huawei, 3GPP TSG-RAN WG3#66bis, R3-100162, "Overview to LTE Energy Saving Solutions to Cell Switch Off/on"; Jan. 18-22, 2010.

3GPP TR 36.927, V10.1.0 (Sep. 2011) "Evolved Universal Terrestrial Radio Access (E-UTRA); Potential Solutions for Energy Saving for E-UTRAN".

3GPP TS 36.212 V10.1.0 (Mar. 2011) Technical Specification, "Evolved Universal Terrestrial Radio Access (E-UTRA); Multiplexing and channel coding (Release 10)".

KDDI: "Performance Evaluations of the Signaling Schemes for Transmission Power Information," 3GPP Draft; R1-120673; 3GPP TSG RAN WG1 Meeting #68, Dresden, Germany; Feb. 6-10, 2012, 4 pages.

HTC: "Discussion on Aggressor Cell's Assistance and Synchronization Problem," 3GPP Draft; R1-121787; 3GPP TSG RAN WG1 Meeting #68bis, Jeju, Korea; Mar. 26-30, 2012, 2 pages.

International Search Report in International Application No. PCT/US2013/068123, dated Mar. 31, 2014, 6 pages.

United States Office Action in U.S. Appl. No. 13/667,838, dated Mar. 19, 2015.

3GPP TS 36.213 V10.2.0 (Jun. 2011, Evolved Universal Terrestrial Radio Access (E-UTRA), Physical Layer Procedures (Release 10).

* cited by examiner

WIRELESS COMMUNICATION IN HETEROGENEOUS NETWORKS

TECHNICAL FIELD

The present disclosure generally relates to heterogeneous wireless communication networks, and more particularly, to systems and methods for energy saving in heterogeneous wireless communication networks.

BACKGROUND

In an Evolved Universal Terrestrial Radio Access Network (E-UTRAN), cells of different coverage sizes are deployed to improve cell coverage or to offload traffic. In an E-UTRAN network, small cells (e.g., pico cells, relay cells, or femto cells) are deployed with overlaid macro cells. A network including large cells (e.g., macro cells) and small cells (e.g., pico cells, relay cells, femto cells) is referred to as a heterogeneous wireless communication network or, for simplicity, as a heterogeneous network.

The macro cell and small cells may operate in different frequencies. For example, in a heterogeneous network consisting of macro cells and pico cells, the macro cells may operate on one frequency while the pico cells may operate on another frequency. Operating the macro cells and pico cells on different frequencies helps to reduce the interference among cells. A user equipment (UE) may be connected with a macro cell and a small cell simultaneously to benefit from services provided by both types of cells.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

The present disclosure relates to systems, methods, and apparatuses for improved operation of heterogeneous wireless communication networks through, for example, energy savings. In a heterogeneous network, small cells (e.g., pico cells, relay cells, femto cells) are deployed in selected locations such as hotspots, including, for example, buildings, shopping center, stadiums, etc. Keeping the small cells powered on all the time is potentially unnecessary as the traffic does not always demand the additional coverage that the small cells provide and inefficient because they require power to remain on. For example, the traffic in a building is usually high during business hours while it is low during the night. If all the small cells remain powered on all night time when there is little or no traffic, it would be an inefficient use of energy. Moreover, keeping all the small cells powered on would lead to additional interference among the small cells especially in a densely deployed heterogeneous network. If some of the small cells are turned off when there is no traffic or the traffic is low, the interference among the small cells would be substantially reduced.

To enable energy saving in heterogeneous wireless communication networks, in some implementations, the small cell performs one or more of the following methods: (1) dynamically adjusts transmission power in accordance with the requirement of the user equipment (UE); (2) detects a UE entering its coverage area, with or without assistance from the macro cell; (3) determines whether to provide service for the UE considering its traffic load; (4) transmits auxiliary synchronization signals to enhance its detection reliability and reduce the association time for the UE to connect to it. The above listed methods allow the small cell, under select circumstances, to intelligently turn on or turn off its transceiver, or adjust its transmission power according to the traffic, thereby efficiently utilizing the energy and achieving energy saving in the heterogeneous network. A detailed presentation of these energy saving systems, methods, and apparatuses will be provided.

Reference will now be made in detail to the example embodiments implemented according to the disclosure; the examples are illustrated in the accompanying drawings. Wherever possible, the same reference numbers will be used throughout the drawings to refer to the same or like parts.

Figure 1:
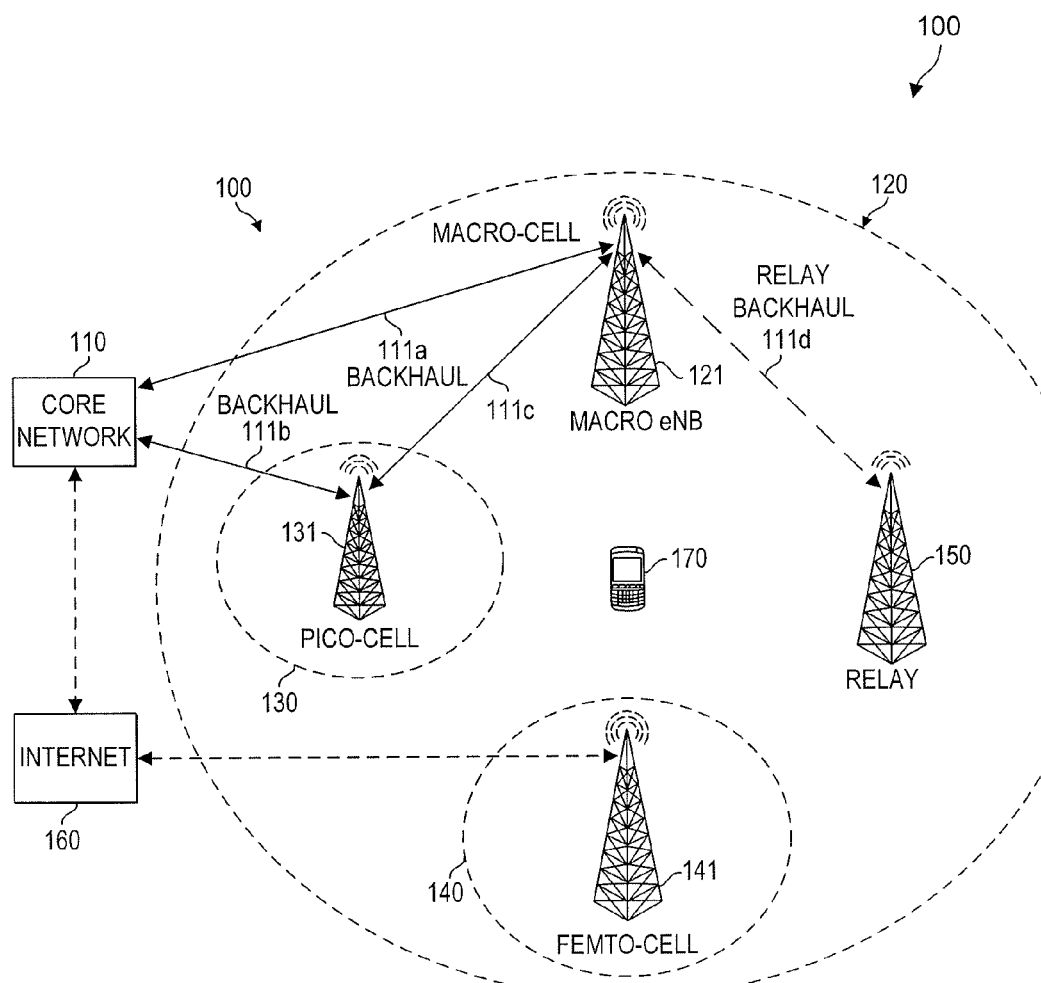
FIG. 1 illustrates an example heterogeneous wireless communication network for implementing methods and systems consistent with the present disclosure.

FIG. 1 illustrates an example heterogeneous wireless communication network 100 in which systems and methods consistent with this disclosure may be implemented. The term "heterogeneous wireless communication network" or "heterogeneous network" may also be referred to as a "HetNet." The illustrated heterogeneous network 100 includes a core network 110 and a macro cell or overlay cell 120. The term "cell" or "wireless cell" generally refers to an area of coverage of wireless transmission by a network or network component, such as an access node. The core network 110 is, in some implementations, connected to the Internet 160. In the illustrated implementation, the macro cell 120 includes at least one base station. The term "base station" can be interchangeably used with a network node, an access node, or a network component. Two or more base stations may operate on the same radio frequency or on different radio frequencies.

The base station is, in some implementations, an overlay access node 121 connected to the core network 110 via a backhaul link 111a, including optical fiber or cable. The term "overlay access node" generally refers to a network element or component that at least partly serves to form a wireless cell. In one implementation in which the network 100 is a long term evolution (LTE) network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro cell can be generally referred to as a "macro eNB." The term "eNB" may be interchangeably used with an "evolved node B." The eNBs may cooperate to conduct a mobility procedure for User Equipment (UE) in the network 100.

The network 100 also includes, in some implementations, one or more underlay cells, for example, a pico cell 130 and a femto cell 140. In some implementations, the underlay cells have a coverage at least partially overlapping with the coverage of the macro cell 120. While the term "underlay cell" is described herein in the context of the LTE standard, other wireless standards also have components similar to underlay cells. For example, cellular telecommunication systems such as Global System for Mobile Communication (GSM) protocols, Universal Mobile Telecommunications System (UMTS), and wireless broadband communication systems such as IEEE 802.11 WLAN, IEEE 802.16 WiMAX network may also include small cells such as pico/femto cells. The implementations described herein can be adapted for such standards without departing from the scope of this disclosure.

Although FIG. 1 illustrates only one pico cell and only one femto cell, the network 100 can include more or less cells. The underlay cells 130, 140 have a smaller coverage than the overlay cell 120. For example, in a suburban environment, the overlay cell 120 may have a coverage radius of 0.5 kilometer, while the underlay cells 130, 140 may have a coverage radius of 0.2 kilometer.

Access nodes 131, 141 forming the underlay cells 130, 140 use a lower transmission power than that of the overlay access node 121. The underlay cells 130, 140 may further include a range expansion area used for increasing the coverage area for the cells having a smaller coverage.

The pico cell 130 includes a pico eNB 131 connected to the core network 110 via a backhaul link 111b and to the macro eNB 121 via a backhaul link 111c. The backhaul links 111b and 111c include cable, fiber, wireless links, or others. In some implementations, the pico eNB 131 can have a transmission power that is, for example, about 30 dBm, which is about 13 dB lower than that of the macro eNB 121.

The femto cell 140 includes a femto eNB 141 connected to the core network 110 via the Internet 160 via a wired or wireless connection. The femto cell 140 is a subscription based cell and can be referred to as a closed subscription group (CSG) cell. The term "closed subscription group (CSG)" can be interchangeably used with closed subscriber group. The term "femto eNB" can also be referred to as a "home eNB (HeNB)." In such instances, the macro eNB 121 can be referred to as a source eNB. In some implementations, the femto eNB 141 can have a transmission power that is, for example, about 20 dBm, which is about 23 dB lower than that of the macro eNB 121.

The network 100 also includes, in some implementations, a relay node 150 that serves to wirelessly relay data and/or control information between the macro eNB 121 and user equipment 170. The macro eNB 121 and the relay node 150 are connected to each other via a wireless backhaul link 111d. In such an instance, the macro eNB 121 is referred to as a donor eNB. In some implementations, the relay node 150 has a transmission power that is, for example, about 30 or 37 dBm, which is about 13 dB or 6 dB lower than that of the macro eNB 121. The term "underlay access node" generally refers to pico eNBs, femto eNBs, or relay nodes.

The user equipment 170 communicates wirelessly with any one of the overlay access node 121 or the underlay access nodes 131, 141, 150, depending on the location or the existence of subscription in the case of the femto cell 140. The term "user equipment" (alternatively "UE") refers to various devices with telecommunications capabilities, such as mobile devices and network appliances. The UE may maintain connections with both an overlay access node and an underlay access node and communicate with them simultaneously. For example, the overlay access node may serve the control plane traffic for the UE, and the underlay access node may serve the data plane traffic for the UE.

Examples of user equipments include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 includes a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 170 includes the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
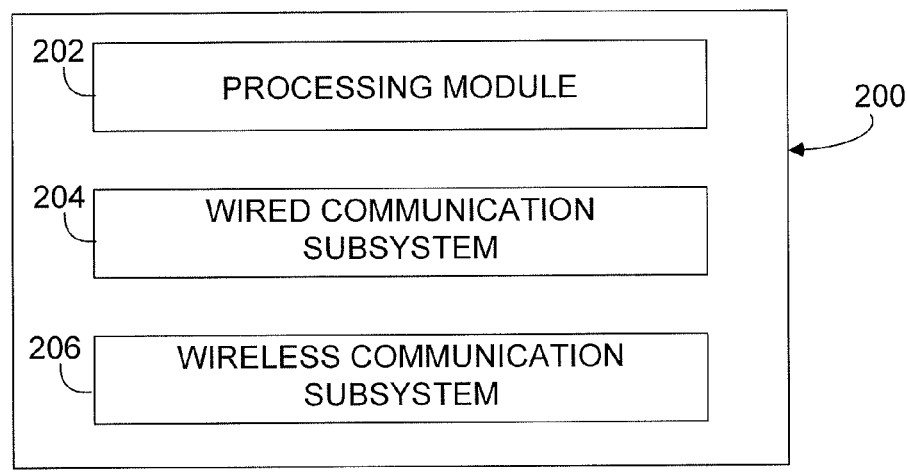
FIG. 2 illustrates an example access node device, in accordance with an embodiment of the present disclosure.

FIG. 2 illustrates an example access node device 200 consistent with certain aspects of this disclosure. The example access node device 200 includes a processing module 202, a wired communication subsystem 204, and a wireless communication subsystem 206. The processing module 202 includes one or more processing components (alternatively referred to as "processors" or "central processing units" (CPUs)) operable to execute instructions associated with managing IDC interference. The processing module 202 also includes other auxiliary components, such as random access memory (RAM), read only memory (ROM), secondary storage (for example, a hard disk drive or flash memory). Additionally, the processing module 202 executes certain instructions and commands to provide wireless or wired communication, using the wired communication subsystem 204 or a wireless communication subsystem 206. One skilled in the art will readily appreciate that various other components can also be included in the example access node device 200.

Figure 3:
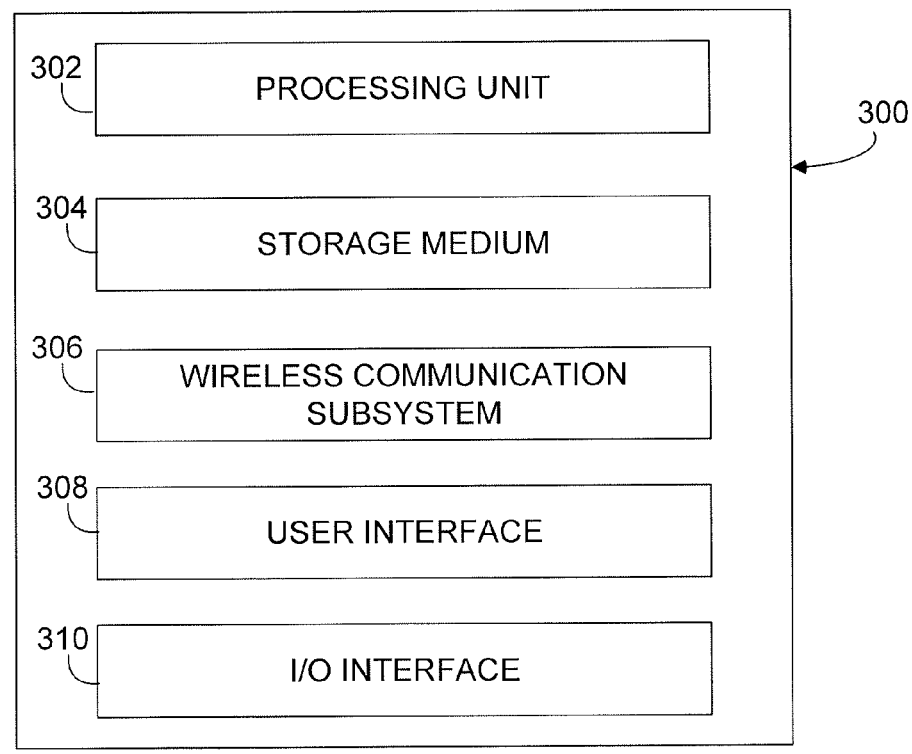
FIG. 3 illustrates an example user equipment device, in accordance with an embodiment of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 includes components and performs functions similar to the processing module 202 described with regard to FIG. 2. The wireless communication subsystem 306 is configured to provide wireless communications for data information or control information provided by the processing unit 302. The wireless communication subsystem 306 includes, for example, one or more antennas, a receiver, a transmitter, a local oscillator, a mixer, and a digital signal processing (DSP) unit. In some implementations, the wireless communication subsystem 306 can support MIMO transmissions.

The user interface 308 includes, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 includes, for example, a universal serial bus (USB) interface. One skilled in the art will readily appreciate that various other components can also be included in the example UE device 300.

Figure 4:
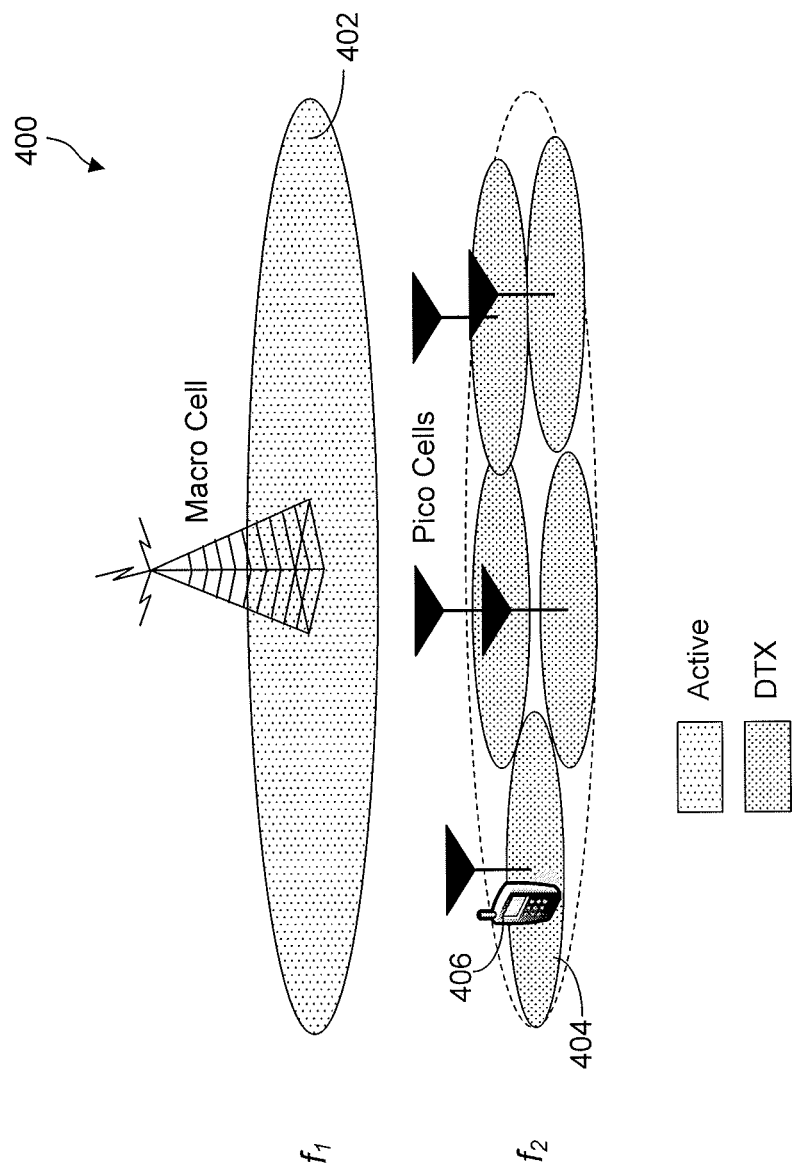
FIG. 4 illustrates an example system diagram for energy saving in a heterogeneous network consistent with the present disclosure.

FIG. 4 illustrates an example scenario 400 for energy saving in a heterogeneous network consistent with the present disclosure. In the heterogeneous network, the small cells may operate in a discontinuous transmission (DTX) mode. The small cells may turn on and off their transceivers according to traffic load of the cells. Referring to FIG. 4, the macro cell 402 operates in an active state, in which the transmission power of the macro cell is turned on at all times, and the macro cell transmits its common reference signals (CRS) periodically. The pico cell, for example pico cell 404, operates in a DTX mode, in which the pico cell discontinuously transmits the CRS in a predefined subframe pattern. In some implementations, the pico cell turns on its transceiver when a UE (e.g., 406) is detected in its coverage area. When there is no UE in the pico cell coverage area, the pico cell turns off transmission thereby reducing overall energy consumption. It should be noted that although a pico cell is used as an example of a small cell in this description of energy saving methods, the provided methods can also be applied to other types of small cells, such as femto cells, relay cells, etc.

In some implementations, during the initial deployment, the pico cells may be initially turned off or operate in a DTX mode. The pico cells maintain the backhaul link with the macro cell via the X2 interface or other possible interfaces. When a UE enters the coverage of a pico cell, the macro cell informs the pico cell via the backhaul linkage. Then the pico cell turns on its transceiver. Prior to the pico cell turning on its transceiver, the UE is connected to the macro cell for both control plane (C-plane) and user plane (U-plane) communications. After the UE is connected to the pico cell, the UE is connected to the macro cell for C-plane communications and connected to the pico cell for the U-plane communications.

Figure 7:
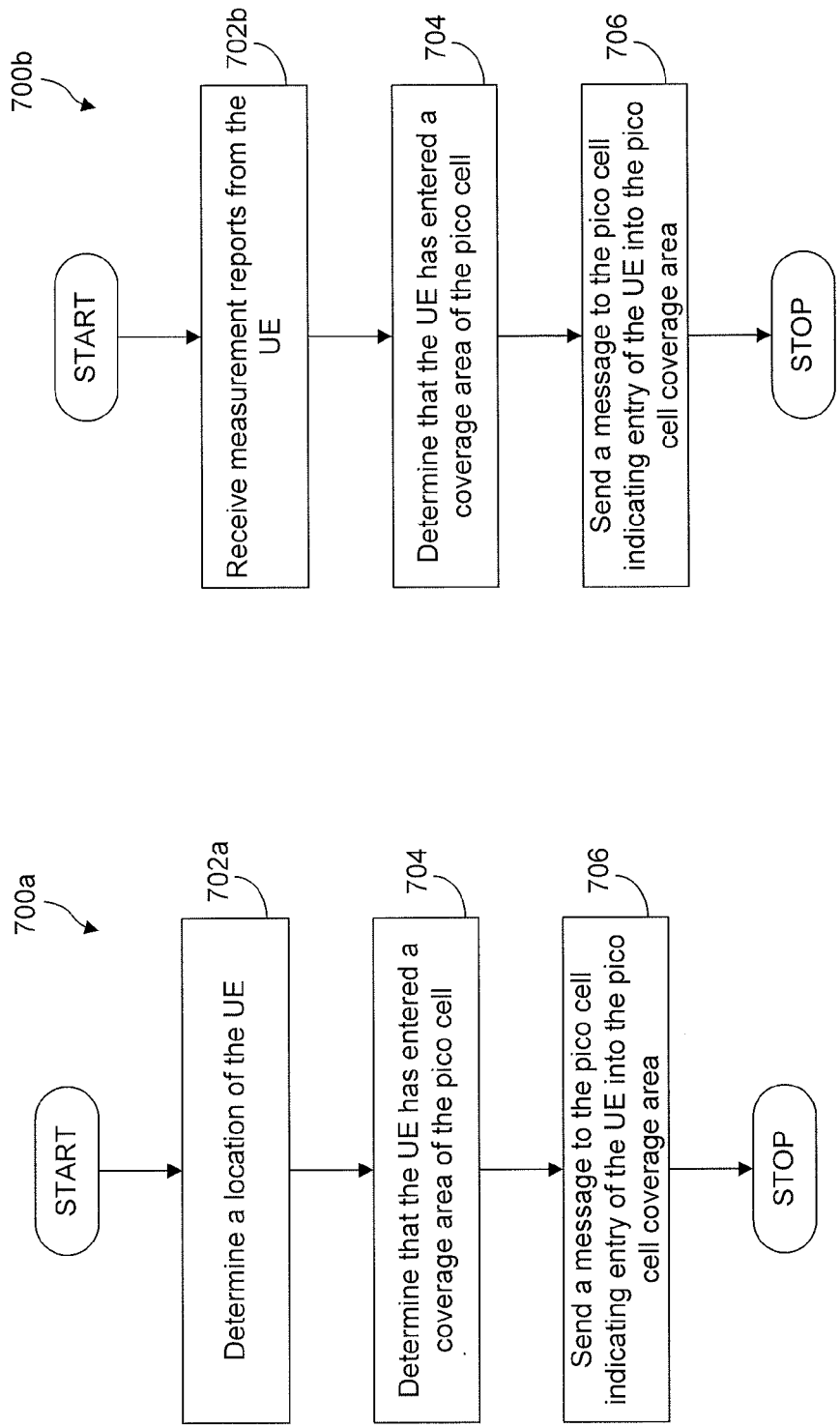
FIG. 7A illustrates a flow diagram of an example method for a pico cell to detect a UE entering its coverage area, in accordance with an embodiment of the present disclosure.
FIG. 7B illustrates a flow diagram of another example method for a pico cell to detect a UE entering its coverage area, in accordance with an embodiment of the present disclosure.

When a UE moves within the pico cell's coverage, in order to improve the spectrum efficiency, the UE may be served by the pico cell depending on various factors, such as the load condition in the macro, the UE required resource, the UE mobility state, the configured pico cell size etc. For example, the UE may need less transmission power to deliver the uplink data to the pico cell. In this case, the pico cell will enter active mode to provide service to the UE. The detection of the UE by the pico cell is described below with reference to FIGS. 7 and 8. In some implementations, a probing timer is used for the UE to detect and measure the pico cells. Upon expiration of the probing timer, the UE will stop accessing the pico cell. Until the UE moves close to another pico cell, the probing timer may be restarted for the UE to access the other pico cell. In short, the pico cell association procedure including measurement and access should be completed before the expiration of the probing timer.

After the pico cell detects an entry of the UE in its coverage area, the pico cell may dynamically adjust its transmission. For example, a stand-alone pico cell may start to provide service to the UE. In the present disclosure, a stand-alone pico cell refers to a pico cell capable of transmitting CRS and other control signaling such as Synchronization Channel/Master Information Block/System information Block (SCH/MIB/SIB). The pico cell may start to transmit its CRS as well as other necessary control signaling subsequent to detecting an entry of the UE into its coverage area. The power level of CRS transmission may stay constant regardless of the UE's position, while the power level of control/data transmission can be flexibly adjusted to accommodate UE's service requirement. If there is no UE in the coverage area of the pico cell, the pico cell may again turn off its Radio Front (RF) or enter the DTX state. For the non-stand-alone pico cell, which does not transmit CRS or other control signaling, demodulation reference signal (DMRS) may be transmitted for data demodulation and/or channel state information (CSI) reference signal (CSI-RS) may be transmitted for CSI estimation. The power level of CSI-RS can be informed to UE in Radio Resource Control (RRC) signaling transmitted from the macro cell. The power level of the DMRS as well as the data transmissions can be flexibly adjusted. Similar to the stand-alone pico cell, if there is no UE in the coverage area of the non-stand-alone pico cell, the non-stand-alone pico cell may again turn off its RF.

Figure 5:
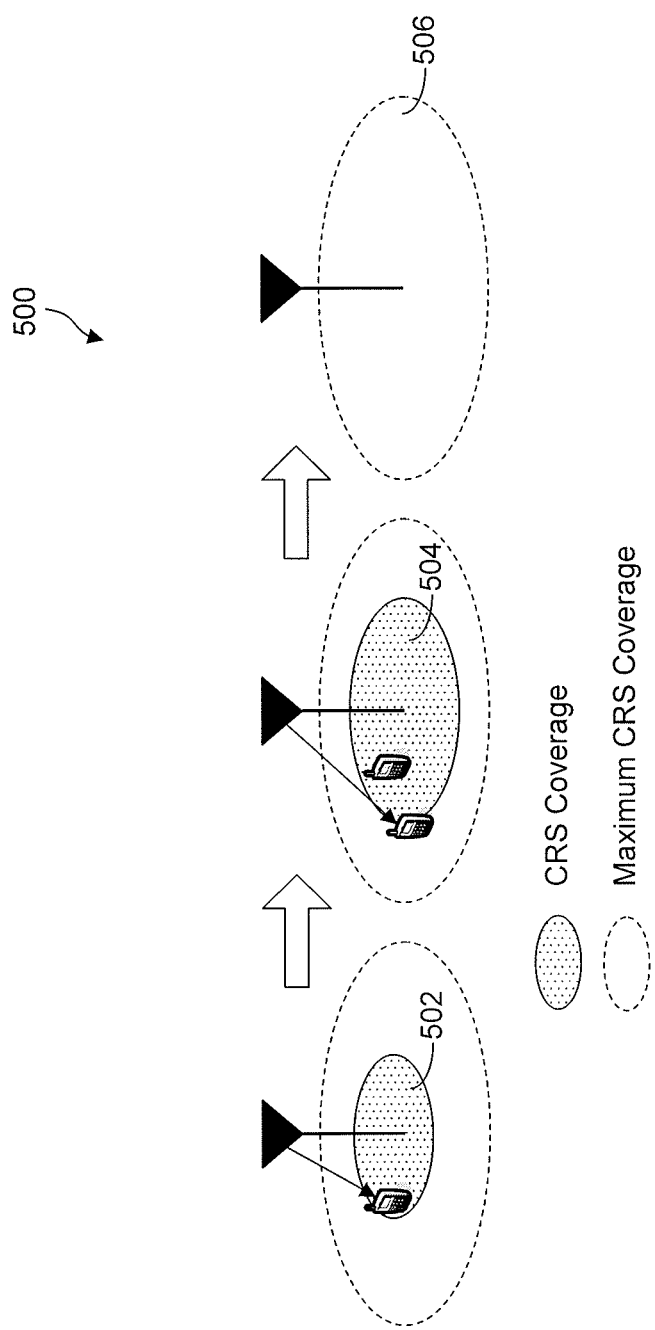
FIG. 5 illustrates another example system diagram for energy saving in a heterogeneous network consistent with the present disclosure.

FIG. 5 illustrates another example system diagram 500 for energy saving in a heterogeneous network consistent with the present disclosure. In this example, the pico cell semi-statically adjusts its CRS transmission power in accordance with its traffic load. As shown in FIG. 5, when there is one UE in the pico cell coverage area, the CRS coverage 502 of the pico cell is smaller than the maximum CRS coverage which can be provided by the pico cell. Once a pico cell starts to provide service to a UE, the downlink (DL) transmission power of the CRS, as well as the transmission power of the layer 1 (L1) control/data channel, are adjusted to accommodate the UE's location and service requirement. The power level of CRS transmission can be semi-statically adjusted while that of L1 control/data transmission can be dynamically adjusted. When the UE is in the cell center of a pico cell, the pico cell may transmit its CRS as well as the data at a low power level.

As more UEs enter the pico cell coverage area, the pico cell increases its CRS transmission power, thereby enlarging its CRS coverage area to CRS coverage 504. For example, once a UE is approaching the cell edge of this pico cell or the existing UE moves to the cell edge of the pico cell, the pico cell may increase its power level correspondingly. As the UEs leave the pico cell coverage area, the pico cell turns off its CRS transmission, and the CRS coverage 506 becomes zero. In some implementations, the transmit power of the pico cell CRS may be provided to the UE by the broadcasting signaling or RRC signaling.

In order to decode the DL data, the energy per resource element (EPRE) for each occupied resource element (RE) should be provided to the UE. In some implementations, a field may be added to the downlink control information (DCI) format to indicate the Pa value. Pa is a UE-specific parameter provided by higher layer to calculate $\rho_A$, where $\rho_A$ is the ratio of physical downlink shared channel (PDSCH) EPRE to cell-specific RS EPRE for the OFDM symbols, which do not contain cell-specific RS. The definition of Pa and $\rho_A$ can be found in 3GPP LTE standards, for example, in 3rd Generation Partnership Project (3GPP) standard technical specification (TS) 36.213 V10.5.0, "Physical layer procedures." As an example to indicate the Pa value, the DCI format 1A is modified as illustrated in Table 1.

In some implementations, the pico cell EPRE information is indicated in a RRC message. For example, an additional parameter p-a' for the pico cell is defined in the PDSCH-Config information element as illustrated in Table 2. Descriptions of the parameter p-a' is illustrated in Table 3.

TABLE 2 modified PDSCH-Config information element

-- ASN1START
PDSCH-ConfigCommon ::=      SEQUENCE (
   p-b                      INTEGER (0..3)
}
PDSCH-ConfigDedicated::=    SEQUENCE {
   EnablingFlag              Boolen
   referenceSignalPower      INTEGER (−60..50),
   p-a                       ENUMERATED {
                             dB-6, dB-4dot77, dB-3,

TABLE 1

Modified DCI format 1A

- Carrier indicator - 0 or 3 bits
- Flag for format0/format1A differentiation - 1 bit, where value 0 indicates
   format 0 and value 1 indicates format 1A
Format 1A is used for random access procedure initiated by a PDCCH order only
   if format 1A CRC is scrambled with C-RNTI and all the remaining fields are
   set as follows:
     - Localized/Distributed VRB assignment flag - 1 bit is set to '0'
     - Resource block assignment - $\lceil \log_2(N_{RB}^{DL}(N_{RB}^{DL}+1)/2) \rceil$ bits, where all bits
       shall be set to 1
     - Preamble Index - 6 bits
     - PRACH Mask Index - 4 bits,
     - All the remaining bits in format 1A for compact scheduling assignment of
       one PDSCH codeword are set to zero
Otherwise,
- Localized/Distributed VRB assignment flag - 1 bit
- Resource block assignment - $\lceil \log_2(N_{RB}^{DL}(N_{RB}^{DL}+1)/2) \rceil$ bits:
    - For localized VRB:
       $\lceil \log_2(N_{RB}^{DL}(N_{RB}^{DL}+1)/2) \rceil$ bits provide the resource allocation
    - For distributed VRB:
       - If $N_{RB}^{DL}$ <50 or if the format 1A CRC is scrambled by RA-RNTI, P-RNTI,
    or SI-RNTI
          - $\lceil \log_2(N_{RB}^{DL}(N_{RB}^{DL}+1)/2) \rceil$ bits provide the resource allocation
       - Else
          - 1 bit, the MSB indicates the gap value, where value 0 indicates
    $N_{gap} = N_{gap,1}$ and value 1 indicates $N_{gap} = N_{gap,2}$
          - ($\lceil \log_2(N_{RB}^{DL}(N_{RB}^{DL}+1)/2) \rceil$ −1) bits provide the resource
    allocation,
- Modulation and coding scheme - 5bits
- HARQ process number - 3 bits (FDD) , 4 bits (TDD)
- New data indicator - 1 bit
   - If the format 1A CRC is scrambled by RA-RNTI, P-RNTI, or SI-RNTI:
     - If $N_{RB}^{DL}$ ≥50 and Localized/Distributed VRB assignment flag is set to 1
       - the new data indicator bit indicates the gap value, where value
          0 indicates $N_{gap} = N_{gap,1}$ and value 1 indicates $N_{gap} = N_{gap,2}$ .
     - Else the new data indicator bit is reserved.
   - Else
     - The new data indicator bit
- Redundancy version - 2 bits
- TPC command for PUCCH - 2 bits
   - If the format 1A CRC is scrambled by RA-RNTI, P-RNTI, or SI-RNTI:
     - The most significant bit of the TPC command is reserved.
     - The least significant bit of the TPC command indicates column $N_{PRB}^{1A}$ of
    the TBS
       - If least significant bit is 0 then $N_{PRB}^{1A}$= 2 else $N_{PRB}^{1A}$= 3.
   - Else
     - The two bits including the most significant bit indicates the TPC
       command
- Downlink Assignment Index (this field is present in TDD for all the uplink
   -downlink configurations and only applies to TDD operation with uplink -
   downlink configuration 1-6. This field is not present in FDD) - 2 bits
 -EPRE value
-Pa value as specified in section 5.2 of [36.213] -- 3 bits TABLE 2-continued modified PDSCH-Config information element

```
                    dB-1dot77, dB0, dB1, dB2,
                    dB3}
    P-a'            TBD
}
-- ASN1STOP
```

TABLE 3

PDSCH-Config field descriptions p-a
Parameter: $P_A$, see TS 36.213 [23, 5.2]. Value dB-6 corresponds to −6 dB, dB-4dot77 corresponds to −4.77 dB etc.
p-b
Parameter: $P_B$, see TS 36.213 [23, Table 5.2-1].
referenceSignalPower
Parameter: Reference-signal power, which provides the downlink reference-signal EPRE
p-a'
parameter p-a' is used for the data demodulation when flexible transmission scheme is enabled.

In some implementations, the additional EPRE value for the pico cell is provided to the UE by a medium access control (MAC) control element (CE). An additional logical channel identification (LCID) may be assigned to indicate the additional MAC CE. An example of the LCID including the additional MAC CE is illustrated in Table 4.

TABLE 4

Values of LCID for downlink shared channel (DL-SCH)

| Index | LCID values |
|---|---|
| 00000 | CCCH |
| 00001-01010 | Identity of the logical channel |
| 01011-11001 | Reserved |
| 11010 | Power allocation command |
| 11011 | Activation/Deactivation |
| 11100 | UE Contention Resolution Identity |
| 11101 | Timing Advance Command |
| 11110 | DRX Command |
| 11111 | Padding |

Figure 6:
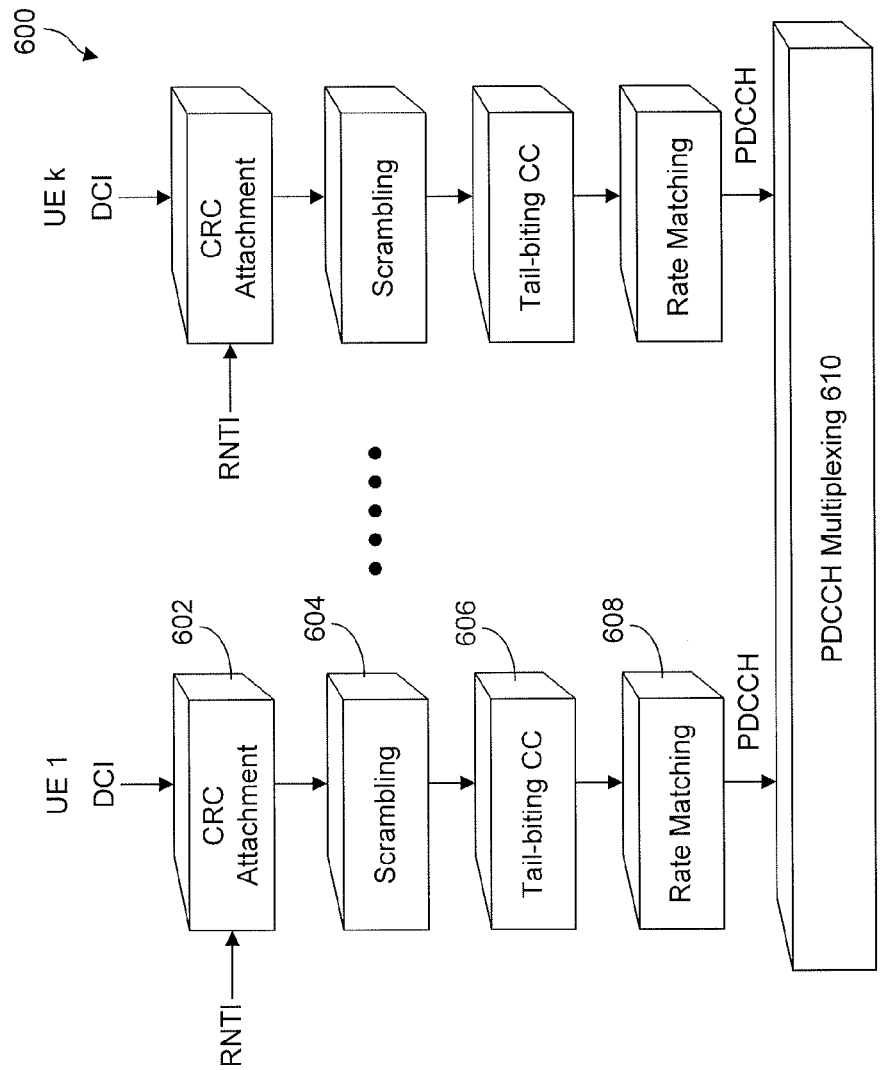
FIG. 6 illustrates an example method for signaling a transmit power of a small cell, in accordance with an embodiment of the present disclosure.

In some implementations, the Pa value for the pico cell is indicated by a sequence scrambled to the physical downlink control channel (PDCCH). FIG. 6 illustrates an example method 600 for signaling a transmit power of a small cell, in accordance with an embodiment of the present disclosure. After attaching the cyclic redundancy check (CRC) to the downlink DCI at 602, a two-step scrambling process 604 may be used. In the first scrambling step, the CRC is scrambled by the radio network temporary identifier (RNTI). And then in the second scrambling step, the scrambled CRC will be scrambled again by another 16 bits sequence, where different sequence indicates a different Pa value. Table 5 illustrates an example of this implicit mapping. It should be noted that different mapping between the Pa and the scrambling sequence number is possible without departing from the scope of the present disclosure.

TABLE 5

Mapping of the scrambling sequence

| Scrambling Sequence number | Pa |
|---|---|
| Sequence 1 | 3 |
| Sequence 2 | 2 |
| Sequence 3 | 1 |
| Sequence 4 | 0 |
| Sequence 5 | −1 |
| Sequence 6 | −2 |
| Sequence 7 | −3 |
| Sequence 8 | −6 |
| . . . | . . . |

Subsequent to the scrambling, a tail-biting convolutional code is applied at 606 and then a rate matching is applied at 608 to generate the physical downlink control channel (PDCCH) signal. The same steps of 602-608 are performed at multiple UEs (e.g., UE 1 and UE k as shown in FIG. 6) to generate the PDCCH signal for each UE. The PDCCH signals of multiple UEs are then multiplexed together for downlink control channel transmission at 610.

When a UE moves to the pico cell's coverage area, in order to improve the spectrum efficiency, the UE is served by the pico cell depending on the load condition in the macro cell, the UE required resource, the UE mobility state, the configured pico cell size, etc. Since initially the pico cell is powered off or in a DTX mode, the pico cell would need to be aware that a UE is approaching and enter an active mode to serve the UE. FIG. 7A illustrates a flow diagram of an example method 700a for a pico cell to detect a UE entering its coverage area, in accordance with an embodiment of the present disclosure. In this method, the macro cell assists the pico cell to detect the UE. The macro cell determines a location of the UE at 702a. For example, the macro cell obtains the UE's position information through positioning technologies such as observed time difference of arrival (OTDOA) or beam-related information. The macro cell may also obtain the UE's position information taking advantage of a GPS equipment installed in the UE. The macro cell may then determine that the UE has entered a coverage of the pico cell at 704 based on the UE's location. Subsequently, the macro cell may send a message to the pico cell via backhaul linkage at 706, indicating that the UE's entry into the pico cell coverage area.

To facilitate the pico cell detection of this UE, the macro cell may also provide some related information to the pico cell via backhaul linkage. For example, the macro cell may send the configuration of sounding reference signal (SRS), DMRS, or other UE-specific signaling to the pico cell. In some implementations, the macro cell may send the scheduling grant for this UE to the picocell when the latency over the backhaul linkage is low. After receiving the scheduling grant from the macro cell, the pico cell may start to monitor the UE and/or turn on its CRS transmission.

FIG. 7B illustrates a flow diagram of another example method 700b for a pico cell to detect a UE entering its coverage area, in accordance with an embodiment of the present disclosure. In this method, the pico cell transmits its CRS either in each subframe or in a discontinuous manner. The macro cell may determine a UE's entry into the pico cell coverage area by the measurement reports received from the UE and may not need to acquire the position information of the UE. As shown in FIG. 7B, the macro cell receives measurement reports from the UE at 702b. Specifically, the UE may continuously monitor the pico cells' signaling strength, such as Reference Signal Receive Power/Reference Signal Receive Quality (RSRP/RSRQ), and send measurement reports to the macro cell when a certain condition is met. For example, when the monitored pico cells' RSRP/RSRQ values exceed a certain threshold, the UE may report the cell IDs of the pico cells to the macro cell. The threshold may be set taking into account the transmit power difference between a macro cell and pico cell. As a result, the macro cell may determine that the UE is entering the pico cell's coverage area at 704 based on the measurement reports. Subsequently, the macro cell may send a message to the pico cell at 706, indicating the UE's entry into the pico cell's coverage area.

To facilitate the pico cell detection of this UE, the macro cell may also provide some related UE information to the pico cell via backhaul linkage. For example, the macro cell may send the configuration of SRS, DMRS, or other UE-specific signaling to the pico cell. In some implementations, the macro cell may send the scheduling grant for this UE to the pico cell when the latency over the backhaul linkage is low. After receiving the specific UE information from the macro cell, the pico cell may start to monitor the UE and/or adjust its transmission power.

Figure 8:
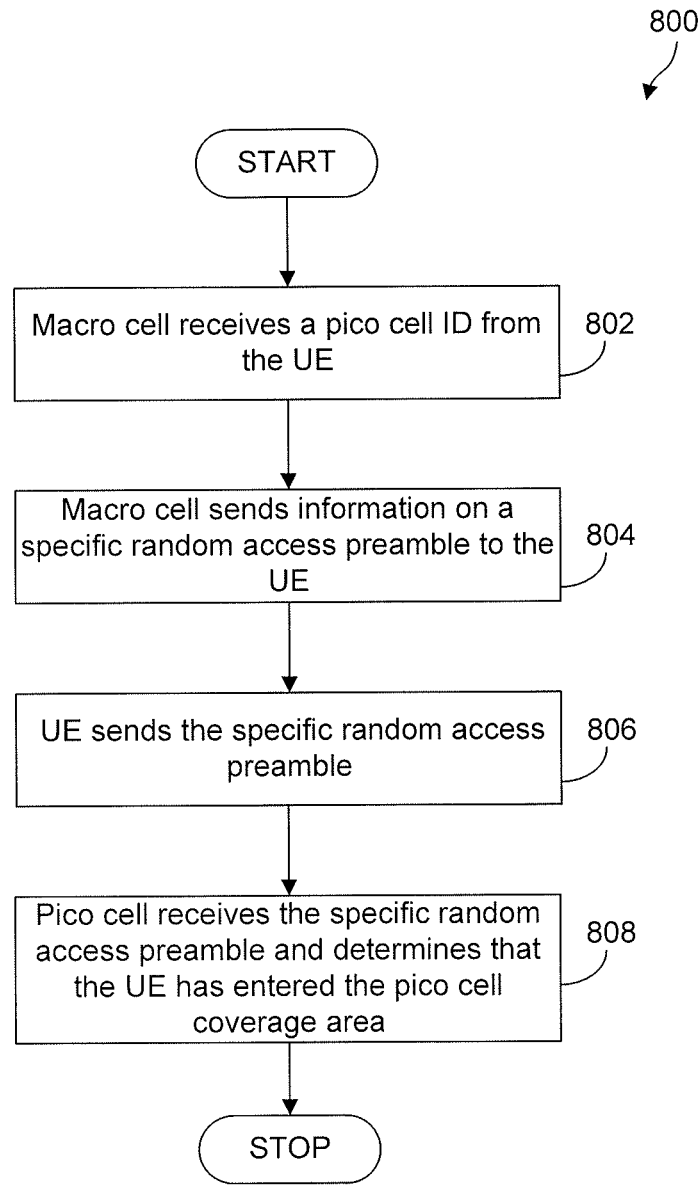
FIG. 8 illustrates a flow diagram of yet another example method for a pico cell to detect a UE entering its coverage area, in accordance with an embodiment of the present disclosure.

FIG. 8 illustrates a flow diagram 800 of yet another example method for a pico cell to detect a UE entering its coverage area, in accordance with an embodiment of the present disclosure. In this method, the macro cell may receive a pico cell ID from the UE at 802. For example, the UE may continuously monitor the pico cell's signaling strength such as RSRP/RSRQ. When the monitored pico cell's RSRP/RSRQ value exceeds a certain threshold, the UE may report the pico cell ID to the macro cell.

The macro cell may then send information on a specific random access preamble to the UE at 804. The macro cell may also send the physical random access channel (PRACH) resources to the UE. After receiving information on the specific random access preamble, the UE may send the specific random access preamble to access the pico cell at 806. When the PRACH resources are also received at the UE, the UE may send the specific random access preamble on the informed PRACH resources.

Once the pico cell receives the specific random access preamble, the pico cell determines that the UE has entered the pico cell coverage area at 808. By using the specific random access preamble to access the pico cell, the UE indicates that it is approaching the pico cell coverage area. The pico cell may adjust its transmission power accordingly to provide service to the UE based on the detection.

Figure 9:
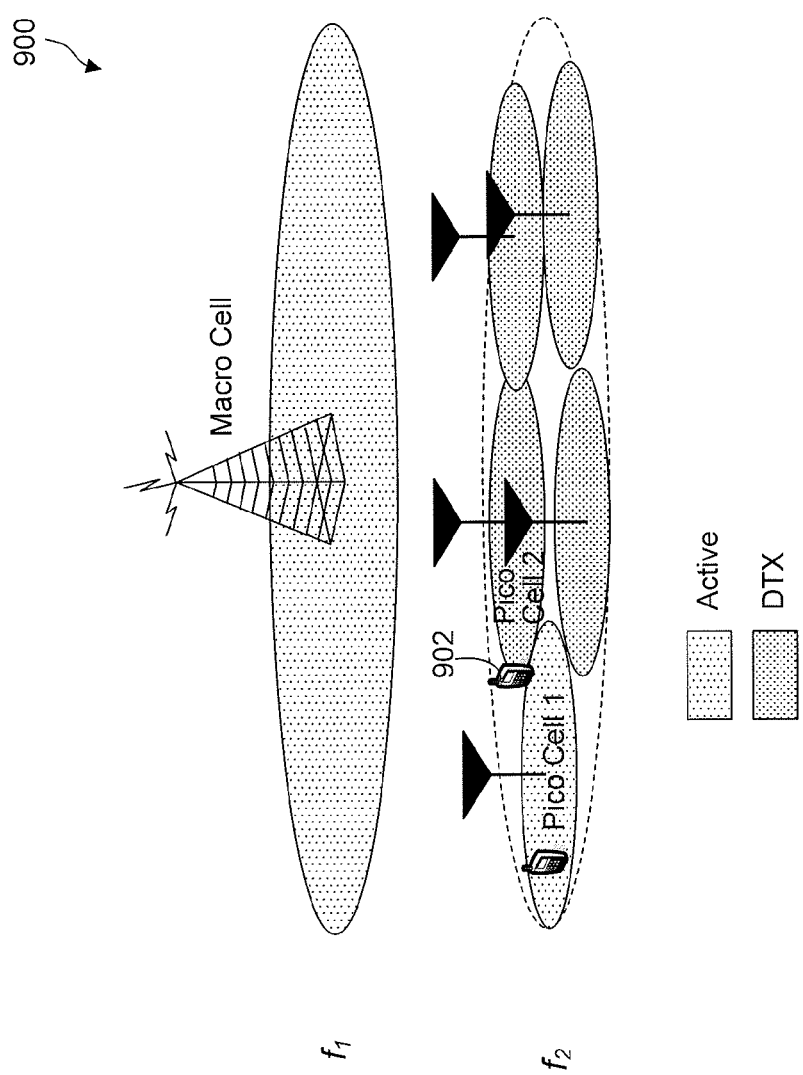
FIG. 9 illustrates an example scenario in a heterogeneous network for implementing methods and systems consistent with the present disclosure.

In a dense deployment of pico cells, there may be situations where a UE enters cell coverage areas of multiple pico cells. In these situations, pico cell selection methods may be used to determine an appropriate pico cell to serve the UE and achieve energy saving in the meantime. FIG. 9 illustrates an example of this scenario 900, where a UE is within coverage of multiple pica cells in a heterogeneous network. As shown in FIG. 9, UE 902 is located within both the coverage areas of pico cell 1 and pico cell 2. Since pico cell 1 is in an active mode and pico cell 2 is in DTX mode at this time, it may be more energy efficient for pico cell 1 to serve the UE 902 instead of pico cell 2. In doing so, the pico cell 2 remains in an energy saving mode and conserves its energy consumption. In addition, as the pico cell 2 remains in the DTX mode, the mutual interference among the pico cells is reduced.

To assist the UE with selection of a particular pico cell as a serving cell, the macro cell may provide the UE with a bias value for selecting the serving pico cell. For example, in order to make UE 902 select pico cell 1 in FIG. 9, the macro cell may provide the UE with a positive bias with respect to pico cell 1. The bias value may depend on the received power difference between pico cell 1 and pico cell 2. Consequently, although the received power from pico cell 2 may be equal or higher than that from pico cell 1 at the UE, the UE will still select pico cell 1 as its serving cell.

Figure 10:
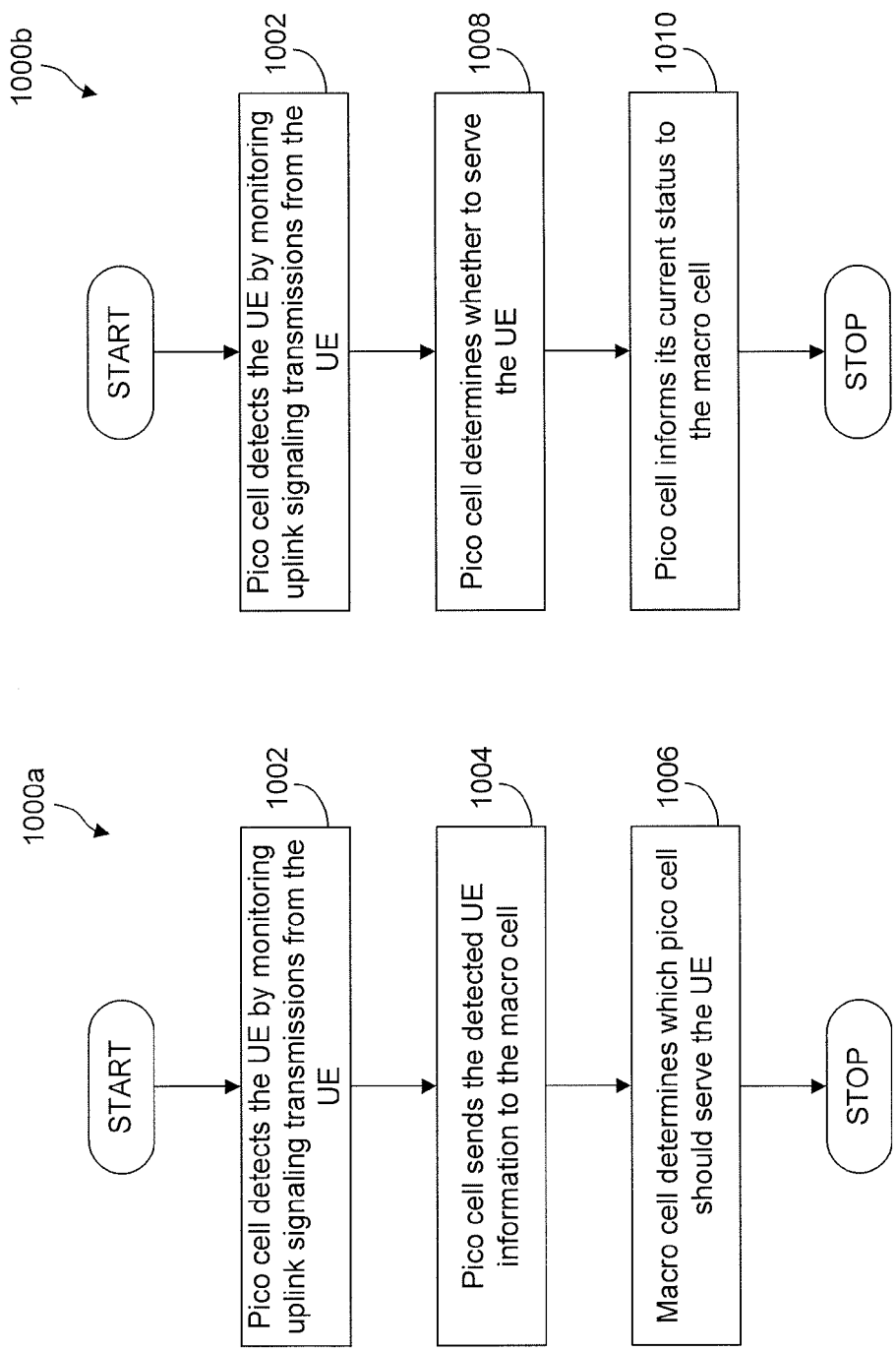
FIG. 10A illustrates a flow diagram of an example method for a pico cell selection, in accordance with an embodiment of the present disclosure.
FIG. 10B illustrates a flow diagram of another example method for a pico cell selection, in accordance with an embodiment of the present disclosure.

FIG. 10A illustrates a flow diagram of an example method 1000a for a pico cell selection, in accordance with an embodiment of the present disclosure. In this method, the macro cell collects information from the pico cells and determines one or more pico cells to serve the UE. As shown in FIG. 10A, the pico cell detects the UE by monitoring uplink signaling transmissions from the UE at 1002. The uplink signaling can be any UE-specific signaling such as SRS, DMRS, etc. The pico cell may receive configurations of the UE-specific signaling from the macro cell to be able to monitor these signaling. If the PDCCH information for this UE is sent to the pico cell by backhaul linkage, the pico cell can also detect this UE based on the PDCCH information.

Once a pico cell detects a UE, the pico cell may send the detected UE information to the macro cell via the backhaul linkage at 1004. This information may include detected signaling strength from the UE, detected UE ID and other related information. After receiving the detected UE information sent from the pico cell, the macro cell may determine which pico cell should serve the UE at 1006. The criteria for the selection of the pico cell may include aspects such as the traffic requirement of the UE, the traffic load of each pico cells, the number of served UEs in each pico cell, or other related requirements. Once the macro cell determines which pico cells are selected to serve the UE, the macro cell may notify these pico cells about this information via backhaul linkage.

FIG. 10B illustrates a flow diagram of another example method 1000b for a pico cell selection, in accordance with an embodiment of the present disclosure. In this method, the pico cell determines whether it will serve the detected UE on its own. Similar to method 1000a, the pico cell detects the UE by monitoring uplink signaling transmissions from the UE at 1002. The uplink signaling can be any UE-specific signaling such as SRS, DMRS, etc. The pico cell may receive configurations of the UE-specific signaling from the macro cell to be able to monitor these signaling.

Once a UE is detected, the pico cell may determine whether to serve the UE as its serving base station at 1008. For example, the pico cell may decide to serve the UE as its serving base station and start to transmit synchronization channel and other system information following detecting a UE's entry into the pico cell coverage area. The pico cell may also decide not to serve the UE and not to turn on its transmitter after detecting the UE. The pico cell may determine whether to serve the UE based on the traffic loading of the pico cell, and/or the traffic loading of other pico cells near the UE. If the pico cell decides to serve the UE, the pico cell may provide its current status to the macro cell via backhaul linkage at 1010. The macro cell may then inform other pico cells near the UE of the serving cell ID for this UE.

After the pico cell to provide services to the UE is determined, the UE may try to obtain the timing, pico cell ID, and/or cyclic prefix (CP) length of the pico cell for initial access. For example, the UE may detect the primary synchronization signal (PSS) and secondary synchronization signal (SSS) of the pico cell to obtain the pico cell ID, CP length, as well as other related information. The PSS/SSS is transmitted in fixed subframe location in LTE or LTE- Advanced systems. To expedite the initial access of the pico cell, the pico cell may transmit auxiliary synchronization channels that allow the UE to detect the pico cell timing, CP length, pico cell ID, or other information by detecting the auxiliary synchronization signals.

Figure 11:
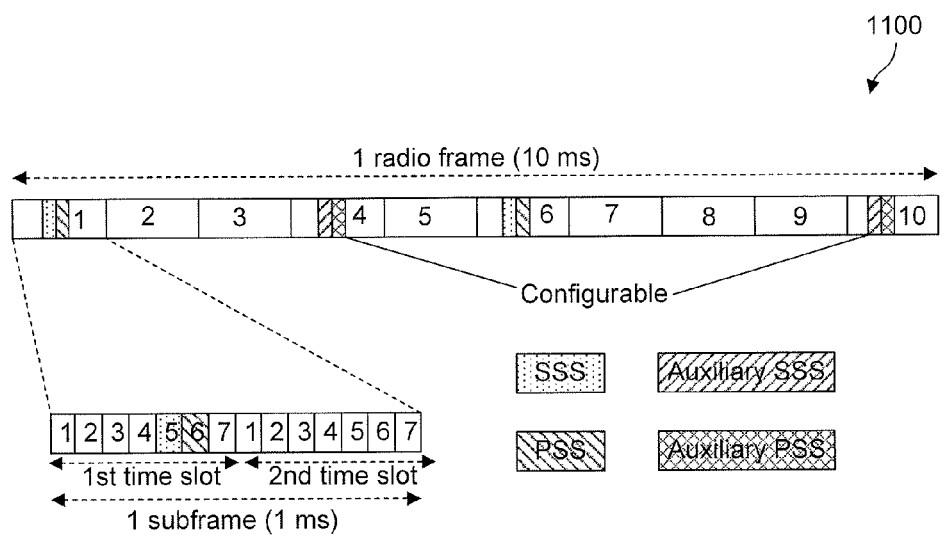
FIG. 11 illustrates an example of an auxiliary synchronization channel for a pico cell, in accordance with an embodiment of the present disclosure.

FIG. 11 illustrates an example of an auxiliary synchronization channel 1100, in accordance with an embodiment of the present disclosure. The auxiliary synchronization channel may include an auxiliary primary synchronization channel and an auxiliary secondary synchronization channel. As shown in FIG. 11, a radio frame may include 10 subframes. A subframe may include two time slots, and each time slot may include 7 OFDM symbols. The synchronization channel (including the primary and secondary synchronization channel) is generally transmitted at the fifth and sixth OFDM symbol of the $1^{st}$ time slot of the first and sixth subframe. As an example, the auxiliary synchronization channel may be transmitted during the $4^{th}$ and $10^{th}$ subframes. The location of the auxiliary synchronization channel may be configurable. It should be understood that the auxiliary synchronization channel may be transmitted at other subframes or OFDM symbols, different from the illustrated example, without departing the scope of the present disclosure. The auxiliary PSS/SSS can have a different signal sequence design from that of the legacy PSS/SSS.

The information on the auxiliary PSS/SSS may be transmitted to the UE in an RRC message, for example, in the MeasObjectEUTRA information element. The modified MeasObjectEUTRA information element with the auxiliary PSS/SSS information is illustrated in Table 6. As shown in Table 6, the "SmallCellList" and 'SmallCellInfo" are added to indicate the auxiliary synchronization channels.

TABLE 6

Modified MeasObjectEUTRA Information Element

```
-- ASN1START
MeasObjectEUTRA ::=                     SEQUENCE {
    carrierFreq                             ARFCN-ValueEUTRA,
    allowedMeasBandwidth                    AllowedMeasBandwidth,
    presenceAntennaPort1                    PresenceAntennaPort1,
    neighCellConfig                         NeighCellConfig,
    offsetFreq                              Q-OffsetRange                DEFAULT dB0,
    -- Cell list
    cellsToRemoveList                       CellIndexList                OPTIONAL, -- Need ON
    cellsToAddModList                       CellsToAddModList            OPTIONAL, -- Need ON
    -- Black list
    blackCellsToRemoveList                  CellIndexList                OPTIONAL, -- Need ON
    blackCellsToAddModList                  BlackCellsToAddModList       OPTIONAL, -- Need ON
    cellForWhichToReportCGI                 PhysCellId                   OPTIONAL, -- Need ON
    ...,
    [[measCycleSCell-r10                    MeasCycleSCell-r10           OPTIONAL, -- Need ON
       measSubframePatternConfigNeigh-r10   MeasSubframePatternConfigNeigh-r10  OPTIONAL
    ]],
    [[smallCellList-r12                     SmallCellList-r12            OPTIONAL, -- Need ON
    ]]
}
CellsToAddModList ::=                   SEQUENCE (SIZE (1..maxCellMeas)) OF CellsToAddMod
CellsToAddMod ::=   SEQUENCE {
    cellIndex                               INTEGER (1..maxCellMeas),
    physCellId                              PhysCellId,
    cellIndividualOffset                    Q-OffsetRange
}
BlackCellsToAddModList ::=               SEQUENCE (SIZE (1..maxCellMeas)) OF
BlackCellsToAddMod
BlackCellsToAddMod ::=   SEQUENCE {
    cellIndex                               INTEGER (1..maxCellMeas),
    physCellIdRange                         PhysCellIdRange
}
MeasCycleSCell-r10 ::=                   ENUMERATED {sf160, sf256, sf320, sf512,
                                                    sf640, sf1024, sf1280, spare1}
MeasSubframePatternConfigNeigh-r10 ::=  CHOICE {
    release                                 NULL,
    setup                                   SEQUENCE {
        measSubframePatternNeigh-r10            MeasSubframePattern-r10,
        measSubframeCellList-r10                MeasSubframeCellList-r10  OPTIONAL -- Need OP
    }
}
MeasSubframeCellList-r10 ::=  SEQUENCE (SIZE (1..maxCellMeas)) OF PhysCellIdRange
SmallCellList-r12 ::=  SEQUENCE (SIZE (1..maxCellSmall)) OF SmallCellInfo-r12
```

TABLE 6-continued

Modified MeasObjectEUTRA Information Element

```
SmallCellInfo-r12 ::=    SEQUENCE {
    AuxiliarySCHPattern        BOOLEN STRING (SIZE (10))    OPTIONAL,
need OR
}
-- ASN1STOP
```

Figure 12:
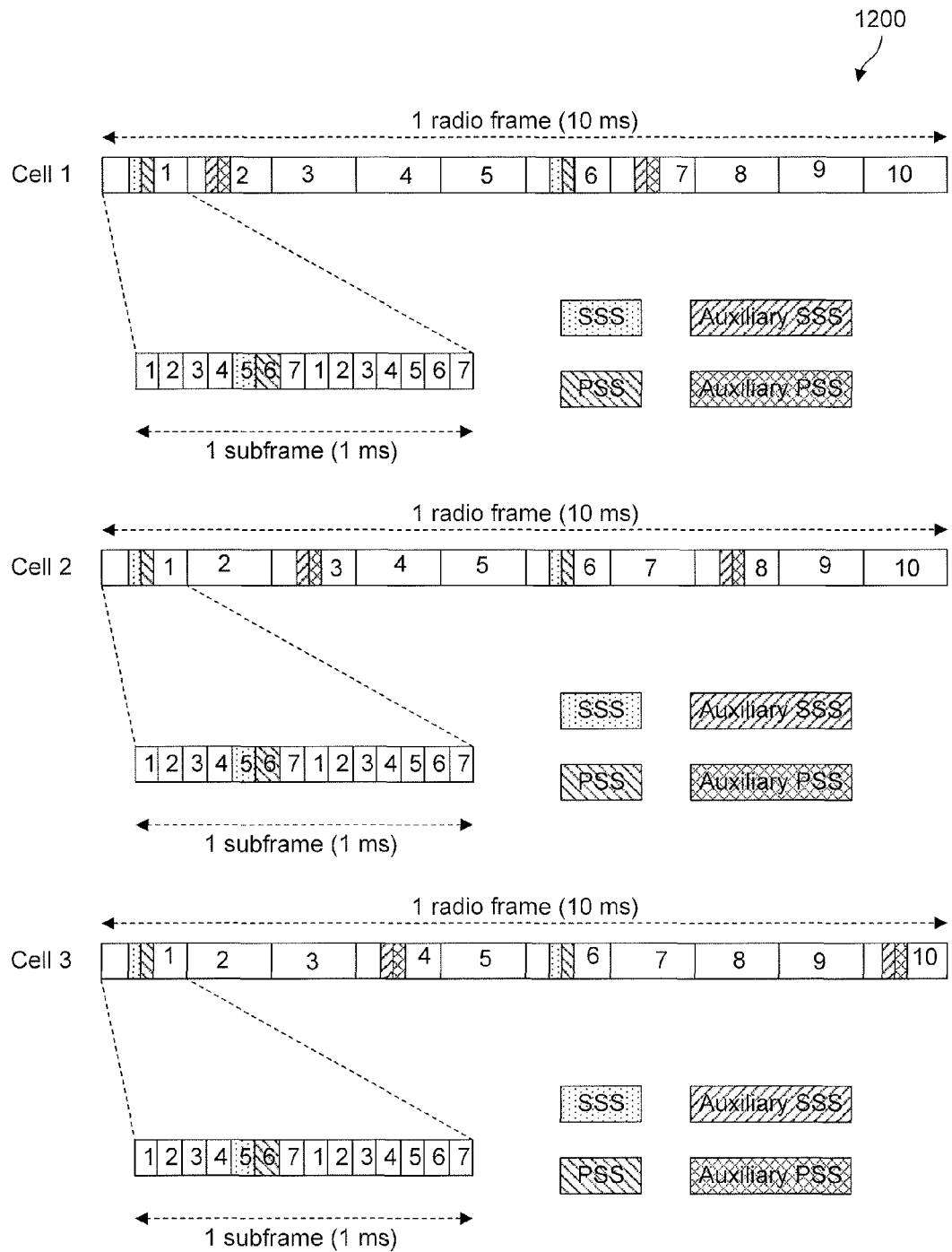
FIG. 12 illustrates an example of auxiliary synchronization channels for multiple pico cells, in accordance with an embodiment of the present disclosure.

FIG. 12 illustrates an example of auxiliary synchronization channels 1200 for multiple pico cells, in accordance with an embodiment of the present disclosure. In order to avoid mutual interference, the configured auxiliary PSS/SSS should be transmitted in different subframes for different pico cells. As illustrated in FIG. 12, cell 1 transmits the auxiliary synchronization signals at the $2^{nd}$ and $7^{th}$ subframes, cell 2 transmits the auxiliary synchronization signals at the $3^{rd}$ and $8^{th}$ subframes, and cell 3 transmits the auxiliary synchronization signals at the $4^{th}$ and $10^{th}$ subframes. By transmitting the auxiliary synchronization signals at non-overlapping subframes, mutual interference among the pico cells is reduced.

In order to avoid the possible impact of the auxiliary synchronization signals on the data demodulation of other UEs, the macro cell or pico cell may inform the UEs about the location of the auxiliary PSS/SSS. Alternatively or in addition, the pico cell may avoid scheduling the UEs in the resources occupied by the auxiliary PSS/SSS.

In some implementations, the macro cell can provide the initial access related information such as pico cell ID, CP length and other pico cell information to the UE by RRC signaling. In some implementations, if the pico cell uses a non-stand-alone carrier, the PSS/SSS may not be transmitted to improve the spectrum efficiency, and as a result, the UE may not obtain the pico cell ID, CP length and other related information simply by detecting the PSS/SSS. In this case, the macro cell may provide such information to the UE by RRC signaling. The macro cell may also include the information carried in the pico cell physical broadcast channel (PBCH) in the RRC signaling to expedite pico cell detection. An illustration of the modification of the RRC signaling can be found in Table 7. As illustrated, the "SmallCellList" and "SmallCellInfo" fields may be added in the MeasObjectEUTRA information element. The "SmallCellInfo" field may include pico cell ID, CP type, physical hybrid HARQ channel (PHICH) duration, PHICH resource, pico cell bandwidth, system frame number, antenna number, and/or other related pico cell information.

```
-- ASN1START
MeasObjectEUTRA ::=              SEQUENCE {
    carrierFreq                      ARFCN-ValueEUTRA,
    allowedMeasBandwidth             AllowedMeasBandwidth,
    presenceAntennaPort1             PresenceAntennaPort1,
    neighCellConfig                  NeighCellConfig,
    offsetFreq                       Q-OffsetRange              DEFAULT dB0,
    -- Cell list
    cellsToRemoveList                CellIndexList             OPTIONAL, --
Need ON
    cellsToAddModList                CellsToAddModList         OPTIONAL, --
Need ON
    -- Black list
    blackCellsToRemoveList           CellIndexList             OPTIONAL, --
Need ON
    blackCellsToAddModList           BlackCellsToAddModList    OPTIONAL, --
Need ON
    cellForWhichToReportCGI          PhysCellId                OPTIONAL, --
Need ON
    smallCellList-r12                SmallCellList-r12            OPTIONAL, -
- Need ON
    ...,
    [[measCycleSCell-r10             MeasCycleSCell-r10     OPTIONAL, -- Need
ON
        measSubframePatternConfigNeigh-r10   MeasSubframePatternConfigNeigh-r10   OPTIONAL
    ]]
}
CellsToAddModList ::=            SEQUENCE (SIZE (1..maxCellMeas)) OF CellsToAddMod
CellsToAddMod ::=    SEQUENCE {
    cellIndex                        INTEGER (1..maxCellMeas),
    physCellId                       PhysCellId,
    cellIndividualOffset             Q-OffsetRange
}
BlackCellsToAddModList ::=       SEQUENCE (SIZE (1..maxCellMeas)) OF
BlackCellsToAddMod
BlackCellsToAddMod ::=    SEQUENCE {
    cellIndex                        INTEGER (1..maxCellMeas),
    physCellIdRange                  PhysCellIdRange
)
MeasCycleSCell-r10 ::=           ENUMERATED {sf160, sf256, sf320, sf512,
                                             sf640, sf1024, sf1280, spare1}
MeasSubframePatternConfigNeigh-r10 ::=  CHOICE {
    release                          NULL,
```

-continued

```
    setup                                SEQUENCE {
        measSubframePatternNeigh-r10         MeasSubframePattern-r10,
        measSubframeCellList-r10             MeasSubframeCellList-r10    OPTIONAL -
- Need OP
    }
}
MeasSubframeCellList-r10 ::=   SEQUENCE (SIZE 1..maxCellMeas)) OF PhysCellIdRange
SmallCellList-r12 ::=    SEQUENCE (SIZE (1..maxCellSmall)) OF SmallCellInfo-r12
SmallCellInfo-r12 ::=    SEQUENCE {
    physCellId                      PhysCellId,
    cp-type                         BOOLEAN                 OPTIONAL, need OR
    phich-Duration                  ENUMERATED {normal, extendecd,
    phich-Resource                  ENUMERATED {oneSixth, half, one, two}
    Bandwidth                       ENUMERATED {6,15,25,50,75,100}
    SFN-number                      BIT STRING (SIZE (10))
    Antenna-number                  ENUMERATED {1,2,4}
}
-- ASN1STOP
```

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A base station configured to:
   determine entry of a user equipment (UE) into a coverage area of a cell managed by another base station in response to receiving a measurement report from the UE, wherein the measurement report indicates a cell identity of the cell and at least one of a reference signal receive power (RSRP) or reference signal receive quality (RSRQ) of a reference signal transmitted by the other base station in the cell, the other base station operates in a discontinuous transmission (DTX) mode and discontinuously transmits the reference signal in a predefined subframe pattern, and the measurement report is received from the UE when the UE determines that at least one of the RSRP or RSRQ exceeds a predefined threshold; and
   send a message to the other base station causing the other base station to enter an active mode to serve the UE.

2. The base station of claim 1, further configured to determine a location of the UE.

3. The base station of claim 1, wherein the base station sends the message to the other base station via a wireline or wireless interface.

4. The base station of claim 1, wherein the other base station is one of a pico cell, a femto cell, or a relay cell.

5. A base station configured to:
   receive, from a user equipment (UE), a random access preamble on a random access channel, wherein the UE receives information of the random access preamble and information of the random access channel from another base station in response to the UE sending a measurement report associated with the base station to the other base station, the measurement report includes at least one of a reference signal receive power (RSRP) or reference signal receive quality (RSRQ) of a reference signal transmitted by the base station, the base station operates in a discontinuous transmission (DTX) mode and discontinuously transmits the reference signal in a predefined subframe pattern, and the UE sends the measure report when the UE determines that at least one of the RSRP or RSRQ exceeds a predefined threshold;
   determine entry of the UE into a cell coverage area of the base station based on the random access preamble; and
   increase a transmit power of a common reference signal (CRS) of the base station based on the determination.

6. The base station of claim 5, wherein the base station is one of a pico cell, a femto cell, or a relay cell.

* * * * *